(12) United States Patent
Melanson et al.

(10) Patent No.: US 9,155,163 B2
(45) Date of Patent: *Oct. 6, 2015

(54) TRAILING EDGE DIMMER COMPATIBILITY WITH DIMMER HIGH RESISTANCE PREDICTION

(71) Applicant: Cirrus Logic, Inc., Austin, TX (US)

(72) Inventors: John L. Melanson, Austin, TX (US); Eric J. King, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/012,775

(22) Filed: Aug. 28, 2013

(65) Prior Publication Data

US 2013/0342123 A1   Dec. 26, 2013

Related U.S. Application Data

(63) Continuation of application No. 13/298,002, filed on Nov. 16, 2011, now Pat. No. 8,547,034.

(60) Provisional application No. 61/414,291, filed on Nov. 16, 2010.

(51) Int. Cl.
  *H05B 37/02* (2006.01)
  *H05B 33/08* (2006.01)
  *H05B 39/04* (2006.01)

(52) U.S. Cl.
  CPC ............ *H05B 37/02* (2013.01); *H05B 33/0815* (2013.01); *H05B 33/0851* (2013.01); *H05B 39/048* (2013.01)

(58) Field of Classification Search
  CPC .......................... H05K 37/02; H05K 33/0815
  USPC ............... 315/220 R, 224, 247, 291, 307
  See application file for complete search history.

(56) References Cited

U.S. PATENT DOCUMENTS

| 4,523,128 A | 6/1985 | Stamm et al. |
| 5,055,746 A | 10/1991 | Hu et al. |

(Continued)

FOREIGN PATENT DOCUMENTS

| CN | 1421986 A | 6/2003 |
| CN | 1459216 A | 11/2004 |

(Continued)

OTHER PUBLICATIONS

Notice of Allowance dated May 28, 2013 mailed in the parent Patent Application No. 13/298,002, 21 pgs.

(Continued)

*Primary Examiner* — Don Le
(74) *Attorney, Agent, or Firm* — Terrile, Cannatti, Chambers & Holland, LLP; Keith B. Chambers

(57) ABSTRACT

In at least one embodiment, an electronic system includes a controller, and the controller provides compatibility between an electronic light source and a trailing edge dimmer. In at least one embodiment, the controller is capable of predicting an estimated occurrence of a trailing edge of a phase cut AC voltage and accelerating a transition of the phase cut AC voltage from the trailing edge to a predetermined voltage threshold. In at least one embodiment, the controller predicts an estimated occurrence of the trailing edge of the phase cut AC voltage on the basis of actual observations from one or more previous cycles of the phase cut AC voltage.

34 Claims, 8 Drawing Sheets

(56) References Cited

U.S. PATENT DOCUMENTS

| | | |
|---|---|---|
| 5,179,324 A | 1/1993 | Audbert |
| 5,321,350 A | 6/1994 | Haas |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman |
| 6,211,624 B1 | 4/2001 | Holzer |
| 6,380,692 B1 | 4/2002 | Newman et al. |
| 6,407,514 B1 | 6/2002 | Glaser et al. |
| 6,510,995 B2 | 1/2003 | Muthu et al. |
| 6,621,256 B2 | 9/2003 | Muratov et al. |
| 7,184,937 B1 | 2/2007 | Su et al. |
| 7,202,608 B2 | 4/2007 | Robinson et al. |
| 7,728,530 B2 | 6/2010 | Wang et al. |
| 7,786,711 B2 | 8/2010 | Wei et al. |
| 8,212,492 B2 | 7/2012 | Lam et al. |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson et al. |
| 8,569,972 B2 | 10/2013 | Melanson |
| 8,610,364 B2 | 12/2013 | Melanson et al. |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,847,515 B2 | 9/2014 | King et al. |
| 2002/0140371 A1 | 10/2002 | Chou et al. |
| 2006/0208669 A1 | 9/2006 | Huynh et al. |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2009/0134817 A1 | 5/2009 | Jurngwirth et al. |
| 2009/0135632 A1 | 5/2009 | Sohma |
| 2009/0284182 A1 | 11/2009 | Cencur |
| 2010/0066328 A1 | 3/2010 | Shimizu et al. |
| 2010/0213859 A1 | 8/2010 | Shteynberg |
| 2010/0231136 A1 | 9/2010 | Reisenbauer et al. |
| 2011/0080110 A1 | 4/2011 | Nuhfer et al. |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0291583 A1 | 12/2011 | Shen |
| 2011/0309759 A1 | 12/2011 | Shteynberg et al. |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0133291 A1 | 5/2012 | Kitagawa et al. |
| 2012/0286686 A1 | 11/2012 | Watanabe et al. |
| 2013/0015768 A1 | 1/2013 | Roberts et al. |
| 2013/0154495 A1 | 6/2013 | He |
| 2014/0009082 A1* | 1/2014 | King et al. .................. 315/247 |

FOREIGN PATENT DOCUMENTS

| | | |
|---|---|---|
| CN | 1748446 A | 3/2006 |
| CN | 1843061 A1 | 10/2006 |
| CN | 101505568 A | 8/2009 |
| CN | 101707874 A | 5/2010 |
| CN | 101835314 | 9/2010 |
| CN | 101926222 | 12/2010 |
| EP | 2232949 B2 | 9/2010 |
| JP | H1145782 A | 2/1999 |
| JP | 2009170240 A | 7/2009 |
| KR | 2101021780 B1 | 3/2011 |
| WO | 9917591 | 4/1999 |
| WO | WO2008029108 A1 | 3/2008 |
| WO | 2008112822 A2 | 9/2008 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

PCT Search Report and Written Opinion issued in corresponding PCT Patent Application No. PCT/US2011/061033 on Feb. 29, 2012, 13 pgs.

Amanci, et al, "Synchronization System with Zero-Crossing Peak Detection Algorithm for Power System Applications", The 2010 International Power Electronics Conference, pp. 2984-2991, Toronto, Ontario, Canada.

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

Supertex, Inc., HV9931 Unity Power Factor LED Lamp Driver, pp. 1-7, 2005, Sunnyvale, California, USA.

First Office Action, Chinese Application No. 201180055250X, The State Intellectual Property Office of the People's Republic of China, May 6, 2015, pp. 1-4.

Search Report, Chinese Application No. 201180055250X, The State Intellectual Property Office of the People's Republic of China, Apr. 26, 2015, pp. 1-2.

* cited by examiner

TRAILING EDGE DIMMER COMPATIBILITY WITH DIMMER HIGH RESISTANCE PREDICTION

CROSS-REFERENCE TO RELATED APPLICATIONS

This application is a continuation of co-pending application Ser. No. 13/298,002, filed Nov. 16, 2011, which claims the benefit of priority under 35 U.S.C. §119(e) and 37 C.F.R. §1.78 to U.S. Provisional Application No. 61/414,291, filed on Nov. 16, 2010 both of these applications are incorporated herein by reference in their entirety.

BACKGROUND OF THE INVENTION

1. Field of the Invention

The present invention relates in general to the field of electronics, and more specifically to a method and system for trailing edge dimmer compatibility with dimmer high resistance prediction.

2. Description of the Related Art

The development and use of energy efficient technologies continues to be a high priority for many entities including many companies and countries. One area of interest is the replacement of incandescent lamps with more energy efficient lamps such as lamps based on electronic light sources. For this description, electronic light sources are light emitting diodes (LEDs) and compact fluorescent lamps (CFLs). The development of electronic light source based lamps and are not without many challenges. One of the challenges is developing electronic light source based lamps that are compatible with existing infrastructure. The following discussion focuses on LED-based lighting systems but is also applicable to CFL-based lighting systems and combination LED and CFL based lighting systems.

Many electronic systems include circuits, such as switching power converters that interface with a dimmer. The interfacing circuits deliver power to a load in accordance with the dimming level set by the dimmer. For example, in a lighting system, dimmers provide an input signal to a lighting system. The input signal represents a dimming level that causes the lighting system to adjust power delivered to a lamp, and, thus, depending on the dimming level, increase or decrease the brightness of the lamp. Many different types of dimmers exist. In general, dimmers generate a digital or analog coded dimming signal that indicates a desired dimming level. A trailing edge dimmer phase cuts a trailing edge of an alternating current ("AC") supply voltage.

FIG. 1 depicts a lighting system 100 that includes a trailing edge, phase-cut dimmer 102. FIG. 2 depicts an exemplary, trailing edge phase cut voltage graph 200 and a dimmer control signal 201 associated with the lighting system 100. Referring to FIGS. 1 and 2, the lighting system 100 receives an AC supply voltage $V_{IN}$ from voltage supply 104. The supply voltage $V_{IN}$, indicated by voltage waveform 202, is, for example, a nominally 60 Hz/110 V line voltage in the United States of America or a nominally 50 Hz/220 V line voltage in Europe. The trailing edge dimmer 102 phase cuts trailing edges, such as trailing edges 202 and 204, of each half cycle of supply voltage $V_{IN}$. Since each half cycle of supply voltage $V_{IN}$ is 180 degrees of the supply voltage $V_{IN}$, the trailing edge dimmer 102 phase cuts the supply voltage $V_{IN}$ at an angle greater than 0 degrees and less than 180 degrees. The phase cut, input voltage $V_{\Phi\_IN}$ to the lighting system 100 represents a dimming level that causes the lighting system 100 to adjust power delivered to a lamp 106, and, thus, depending on the dimming level, increase or decrease the brightness of the lamp 106. The lamp 106 is an incandescent lamp and can generally be modeled as a resistor 108.

The dimmer 102 includes a timer controller 110 that generates dimmer control signal DCS to control a duty cycle of switch 112. The duty cycle of switch 112 is a pulse width, e.g. times $t_1-t_0$, divided by a period of the dimmer control signal, e.g. times $t_3-t_0$, for each cycle of the dimmer control signal DCS. The timer controller 110 converts a desired dimming level into the duty cycle for switch 112. The duty cycle of the dimmer control signal DCS is decreased for lower dimming levels, i.e. higher brightness for lamp 106, and increased for higher dimming levels. During a pulse, e.g. pulse 206 and pulse 208, of the dimmer control signal DCS, the switch 112 conducts, i.e. is ON, and the dimmer 102 enters a low resistance state. In the low resistance state of the dimmer 102, the resistance of the switch 112 is, for example, less than or equal to 10 ohms. During the low resistance state of switch 112, the phase cut, input voltage $V_{\Phi\_IN}$ tracks the input supply voltage $V_{IN}$ and the dimmer 102 transfers a dimmer current $i_{DIM}$ to the lamp 106.

When the timer controller 110 causes the pulse of the dimmer control signal 206 to end, the dimmer control signal 206 turns the switch 112 OFF, which causes the dimmer 102 to enter a high resistance state, i.e. turns OFF. In the high resistance state of the dimmer 102, the resistance of the switch 112 is, for example, greater than 1 kohm. The dimmer 102 includes a capacitor 114, which charges to the supply voltage $V_{IN}$ during each pulse of the timer control signal DCS. In both the high and low resistance states of the dimmer 102, the capacitor 114 remains connected across the switch 112. When the switch 112 is OFF and the dimmer 102 enters the high resistance state, the voltage $V_C$ across capacitor 114 decays, e.g. between times $t_1$ and $t_2$ and between times $t_4$ and $t_5$. The rate of decay is a function of the amount of capacitance C of capacitor 114 and the dimmer current $i_{DIM}$ that is transferred through the resistance R of lamp 108. Equation [1] represents the relationship between the capacitance C of capacitor 114, the dimmer current $i_{DIM}$, and the rate of decay $dV_{\Phi\_IN}/dt$ of the phase cut, input voltage $V_{\Phi\_IN}$:

$$i_{DIM}=C \cdot dV_{\Phi\_IN}/dt \qquad [1]$$

The resistance value R of lamp 106 is relatively low and permits a high enough value of the dimmer current $i_{DIM}$ to allow the phase cut, input voltage $V_{\Phi\_IN}$ to decay to a zero crossing, e.g. at times $t_2$ and $t_5$, before the next pulse of the dimmer control signal DCS.

Trailing edge dimmers, such as trailing edge dimmer 102, have some favorable characteristics. For example, trailing edge dimmer 102 does not have an abrupt voltage increase when the dimmer 102 begins to conduct, e.g. at times $t_0$ and $t_3$, and has a decaying decrease when the dimmer 102 enters the high resistance state. Thus, harmonic frequencies are lower, and the dimmer 102 generates less electromagnetic interference.

As previously discussed, electronic light sources have a higher energy efficiency than incandescent lamps of comparable light out. Thus, electronic light sources are being retrofitted into existing infrastructure that includes trailing edge dimmers, such as trailing edge dimmer 102. An electronic light source has lower power requirements and, thus, less dimmer current $i_{DIM}$ is transferred to the electronic light sources. Thus, in accordance with Equation [1] for a smaller dimmer current $i_{DIM}$, the decay rate $dV_{\Phi\_IN}/dt$ is less. If the decay rate $dV_{\Phi\_IN}/dt$ is too low, the phase cut, input voltage $V_{\Phi\_IN}$ does not reach a zero crossing prior to a beginning of a next cycle of the supply voltage $V_{IN}$. Failure to reach a zero-crossing can cause some trailing edge dimmers to malfunction.

FIG. 3 depicts a lighting system 300 that includes the trailing edge dimmer 102 and LED(s) 302. The dimmer 102 functions as previously described and provides a phase cut, input voltage $V_{\Phi\_IN}$ and a dimmer current to a full bridge diode rectifier 304. The rectifier 304 provides the phase cut, rectified voltage $V_{\Phi\_R}$ to a power converter 306. The power converter 306 respectively converts the phase cut, rectified voltage $V_{\Phi\_R}$ and the rectified input current $i_R$ into an approximately constant output voltage $V_{OUT}$ and an output current $i_{OUT}$. The output current $i_{OUT}$ adjusts with the dimming level indicated by the phase angle of the phase cut, input voltage $V_{\Phi\_IN}$ and is approximately constant for any given dimming level.

The controller 308 includes a current controller 310 to control the transfer of current $i_R$ to the power converter 306 and regulate the power delivered to the LED(s) 302. The LED(s) require substantially less power to provide the equivalent light output of an incandescent bulb. For example, the LED(s) 302 use 4 W of power to provide the equivalent light output of a 60 W incandescent bulb. The output voltage $V_{OUT}$ is generally boosted by the power converter 306 to, for example, 400V. Since the power P provided to the LED(s) 302 is approximately $P=V_{OUT} \cdot i_{OUT}$, a maximum current $i_R$ transferred to the power converter 306 is typically only 50 mA, which is less than the approximately 545 mA maximum current drawn by a 60 W bulb from a 110 V supply input voltage $V_{IN}$. Thus, the decay time $dV_{\Phi\_IN}/dt$ for the lighting system 300 increases in accordance with Equation [1]. The controller 308 includes a comparator 312 to detect trailing edges, such as trailing edges 314 and 316, of the phase cut, rectified voltage $V_{\Phi\_R}$.

Detection of the trailing edge of the phase cut, rectified voltage $V_{\Phi\_R}$ is not a simple task. The trailing edges of rectified input voltage $V_{\Phi R\_IN}$ at times $t_1$ and $t_4$ are generally noisy and may contain other distortions. To detect the trailing edges, the controller 308 utilizes a comparator 312 to detect the trailing edge at a more stable portion of the phase cut, rectified voltage $V_{\Phi\_R}$. The comparator 312 receives the phase cut, rectified voltage $V_{\Phi\_R}$ or a scaled version of the phase cut, rectified voltage $V_{\Phi\_R}$ at an inverting input of the comparator 312. The comparator 312 compares the phase cut, rectified voltage $V_{\Phi\_R}$ with a fixed, trailing edge detection voltage threshold, such as +20V, and generates a trailing edge detection signal TE_DETECT. The trailing edge detection signal TE_DETECT signal is a logical 0 prior to detection of a trailing edge of phase cut, rectified voltage $V_{\Phi\_R}$ and transitions to a logical 1 upon detection of the trailing edge. Once the trailing edge detection signal TE_DETECT indicates detection of the trailing edge, the current controller 310 increases a transfer of current $i_{DIM}$ through the dimmer 102 to increase the rate of decay $dV_{\Phi\_IN}/dt$ and, thus, increase the rate of decay of the phase cut, rectified voltage $V_{\Phi\_R}$ at, for example times $t_2$ and $t_4$. Increasing the rate of decay at times $t_2$ and $t_5$ helps ensure that the phase cut, rectified voltage $V_{\Phi\_R}$ reaches a zero crossing prior to a beginning of a next cycle of the phase cut, rectified voltage $V_{\Phi\_R}$. The trailing edge detection threshold value is set low enough to avoid prematurely detecting a trailing edge. However, because the rate of decay $dV_{\Phi\_IN}/dt$ is greater for electronic light sources, the low value of the trailing edge detection threshold also means that the trailing edge might not be detected before a zero crossing of the phase cut, rectified voltage $V_{\Phi\_R}$ for large phase angles. Increasing the value of the trailing edge detection threshold can result in transferring an unnecessary amount of current from the voltage supply 104.

It is desirable to improve compatibility with trailing edge dimmers.

SUMMARY OF THE INVENTION

In one embodiment of the present invention, an apparatus includes a controller to provide compatibility between a lamp and a trailing edge dimmer. The controller is capable to predict an estimated occurrence of a high resistance state of the trailing edge dimmer. The high resistance state occurs when the trailing edge dimmer begins phase cutting an alternating current (AC) voltage signal. The controller is further capable to operate in a high current mode based on the estimated predicted occurrence of the high resistance state of the trailing edge dimmer. The controller is also capable to operate in a low impedance mode after the AC voltage signal reaches a low voltage threshold.

In a further embodiment of the present invention, a method to provide compatibility between a lamp and a trailing edge dimmer includes predicting an estimated occurrence of a high resistance state of the trailing edge dimmer. The high resistance state occurs when the trailing edge dimmer begins phase cutting an alternating current (AC) voltage signal. The method further includes operating a controller of at least a power converter in a high current mode based on the estimated predicted occurrence of the high resistance state of the trailing edge dimmer. The method also includes operating the controller in a low impedance mode after the AC voltage signal reaches a low voltage threshold.

In another embodiment of the present invention, an apparatus includes a controller that is a capable to predict an estimated occurrence of a high resistance state of a trailing edge dimmer. The high resistance state occurs when the trailing edge dimmer begins phase cutting an alternating current (AC) voltage signal of a phase cut AC voltage. The controller is further capable to accelerate a transition of the AC voltage from the trailing edge to a predetermined voltage threshold.

In a further embodiment of the present invention, a method includes predicting an estimated occurrence of a high resistance state of a trailing edge dimmer. The high resistance state occurs when the trailing edge dimmer begins phase cutting an alternating current (AC) voltage signal of a phase cut AC voltage. The method further includes accelerating a transition of the AC voltage from the trailing edge to a predetermined voltage threshold.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, an electronic system includes a controller, and the controller provides compatibility between an electronic light source and a trailing edge dimmer. In at least one embodiment, the controller is capable of predicting an estimated occurrence of a trailing edge of a phase cut AC voltage and accelerating a transition of the phase cut AC voltage from the trailing edge to a predetermined voltage threshold. The terms "predict" and derivatives thereof, such as "predicting" and "prediction" mean to declare or indicate in advance. Thus, in at least one embodiment, predicting an estimated occurrence of a trailing edge of a phase cut AC voltage declares or indicates in advance the estimated occurrence of the trailing edge of the phase cut AC voltage. In at least one embodiment, the controller predicts an estimated occurrence of the trailing edge of the phase cut AC voltage on the basis of actual observations from one or more previous cycles of the phase cut AC voltage.

In at least one embodiment, to provide compatibility between a trailing edge dimmer and an electronic light source, the controller predicts an estimated occurrence of a high resistance state of the trailing edge dimmer. The trailing edge of a phase cut AC voltage begins when a trailing edge dimmer enters a high resistance state. Thus, the high resistance state occurs when the trailing edge dimmer begins phase cutting an alternating current (AC) voltage signal. Based on the prediction of the estimated occurrence of the high resistance state of the trailing edge dimmer, the controller is capable of and configured to further operate in a high current mode to increase a transfer of current from the trailing edge dimmer. Operating in the high current mode increases a decay rate of the phase cut AC voltage and, in at least one embodiment, ensures that the phase cut AC voltage reaches a low voltage threshold prior to beginning another cycle. Once the phase cut AC voltage reaches the low voltage threshold, the controller is capable of and configured to operate in a low impedance mode to hold the phase cut AC voltage at or below the low voltage threshold.

Figure 4:
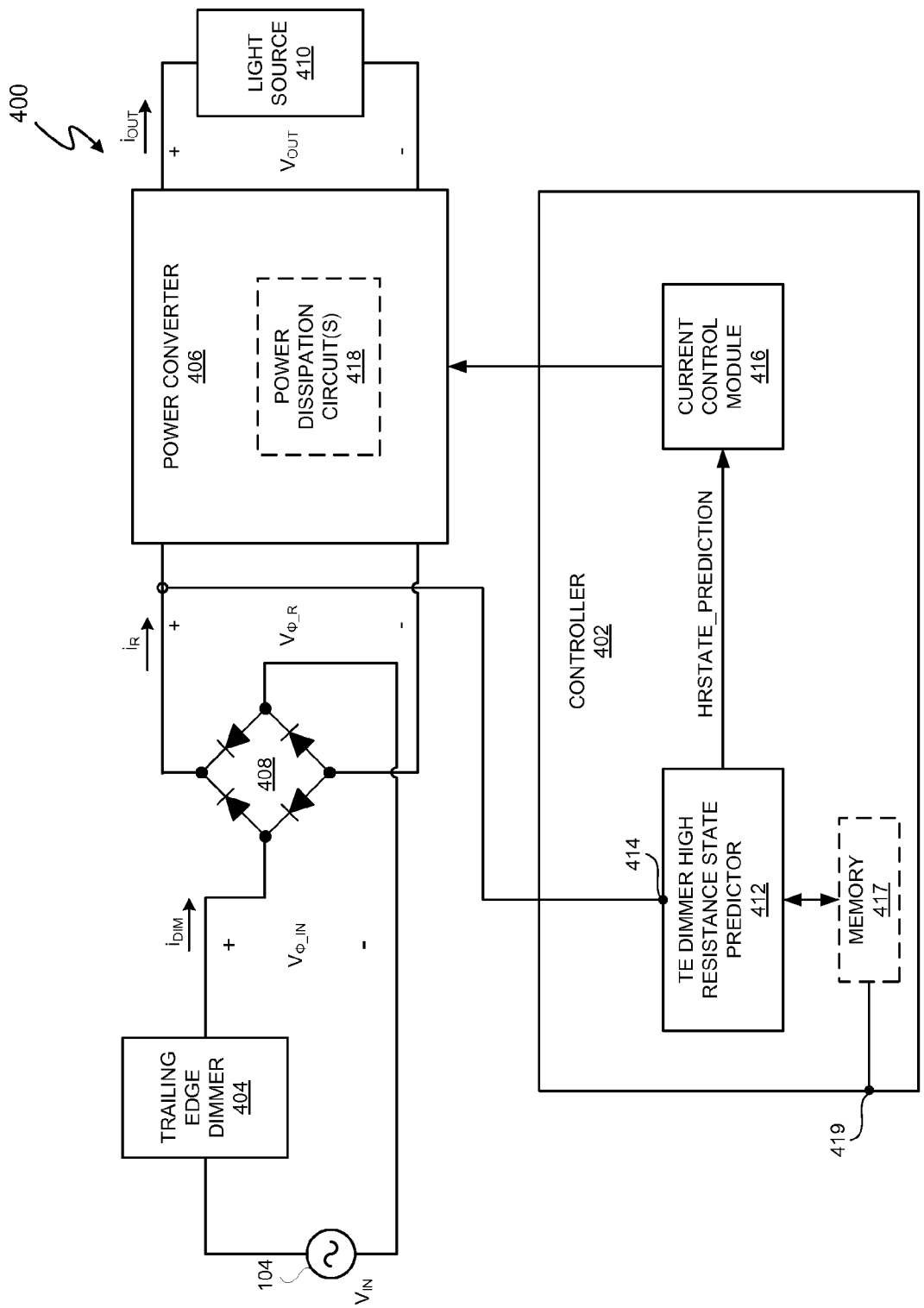
FIG. 4 depicts a lighting system that includes a controller that provides compatibility between the trailing edge dimmer and an electronic light source.

FIG. 4 depicts a lighting system 400 that includes a controller 402 that provides compatibility between the trailing edge dimmer 404 and the light source 410. The trailing edge dimmer 404 can be any trailing edge dimmer, such as trailing edge dimmer 102, that phase cuts a trailing edge of the input supply voltage $V_{IN}$ from voltage supply 104. The full-bridge diode rectifier 408 rectifies the phase cut, input voltage $V_{\Phi\_IN}$ to generate the phase cut, rectified voltage $V_{\Phi\_R}$. The power converter 406 receives the phase cut, rectified voltage $V_{\Phi\_R}$ and the rectified current $i_R$ generates an output voltage $V_{OUT}$ and an output current $i_{OUT}$. The output voltage $V_{OUT}$ and the output current $i_{OUT}$ provide power for the light source 410. In at least one embodiment, the light source 410 is an electronic light source that includes one or more LEDs, one or more CFLs, or a combination of one or more LEDs and one or more CFLs. The power converter 406 can be any type of power converter and can include, for example, a boost converter, a buck converter, a boost-buck converter, or a Cúk converter.

Figure 5:
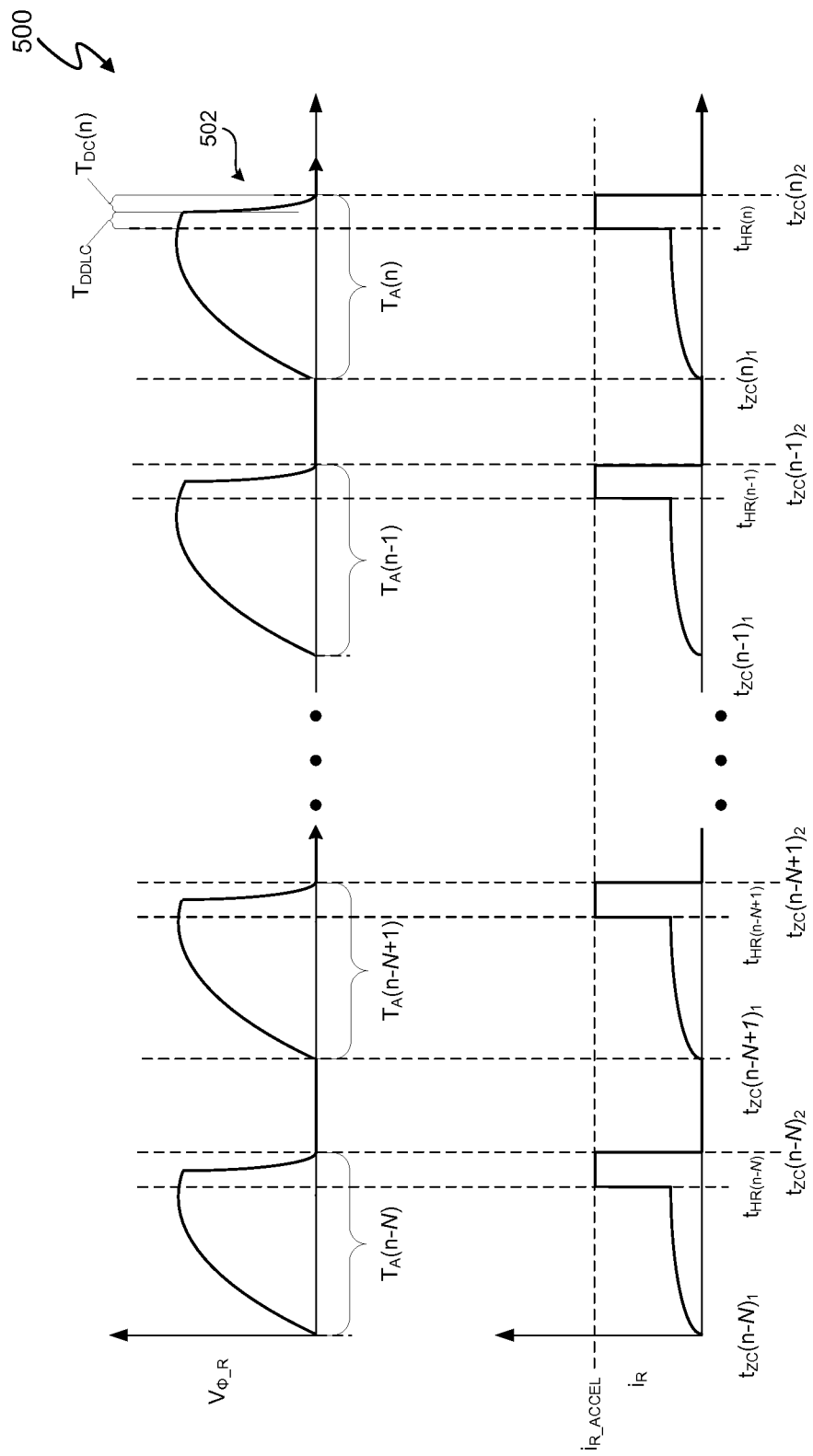
FIG. 5 depicts exemplary voltage and current waveforms during operation of the lighting system of FIG. 4.
Figure 6:
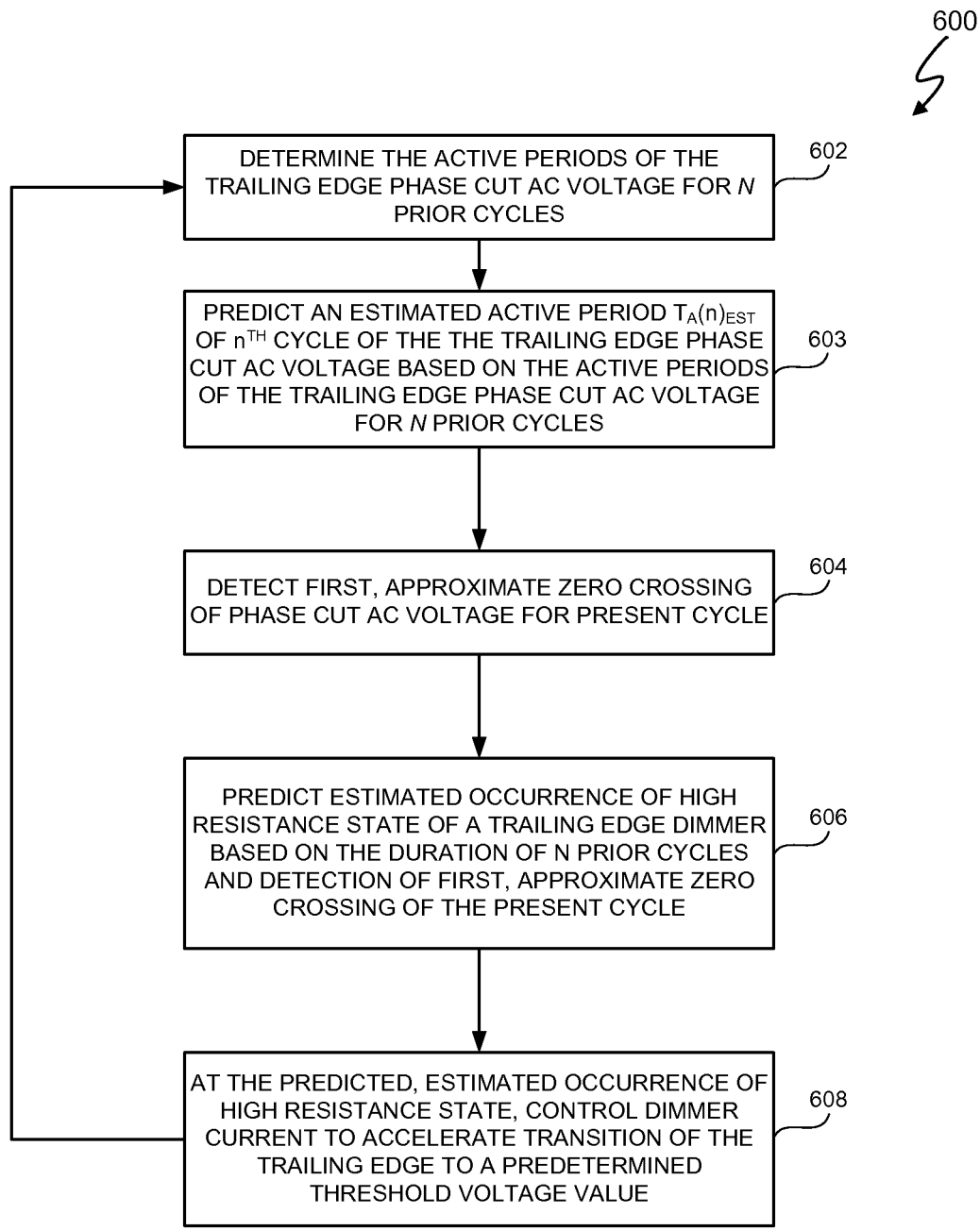
FIG. 6 depicts an exemplary trailing edge compatibility operational flow chart that represents one embodiment of providing compatibility between the trailing edge dimmer and electronic the light source of FIG. 4.

FIG. 5 depicts exemplary voltage and current waveforms 500 during operation of the lighting system 400. FIG. 6 depicts an exemplary trailing edge compatibility operational flow chart 600 that represents one embodiment of providing compatibility between the trailing edge dimmer 404 and the light source 410. Referring to FIGS. 4, 5, and 6, the phase cut, rectified voltage $V_{\Phi\_R}$ has an active period from a first zero crossing to the second zero crossing of each cycle. The waveforms 500 depict a series of active periods $T_A(n)\text{-}T_A(n-N)$ of the phase cut, rectified voltage $V_{\Phi\_R}$, where n is an integer index and N is an integer greater than or equal to one. The "active time period $T_A(n-X)$" refers to the portion of the phase cut AC voltage that is not equal to approximately zero for "X" ranging from 0 to N. In at least one embodiment, the controller 402 predicts an estimated active time period $T_A(n)_{EST}$ of the $n^{th}$ cycle of the phase cut, rectified voltage $V_{\Phi\_R}$ that spans from a first approximate zero crossing at time $t_{ZC}(n)_1$ until the next approximate zero crossing $t_{ZC}(n)_2$ of the active time period $T_A(n)$. $T_A(n)_{EST}$ represents the predicted estimate of the active time period $T_A(n)$ for the present $n^{th}$ cycle.

In at least one embodiment, controller 402 includes a trailing edge dimmer high resistance state predictor 412 to predict the estimated active time period $T_A(n)_{EST}$ of the $n^{th}$ cycle using the actual measured active time periods $T_A(n-1)$ through $T_A(n-N)$ of N previous cycle(s) of the phase cut, rectified voltage $V_{\Phi\_R}$, where N is an integer greater than or equal to 1. The trailing edge high resistance state predictor 412 senses the phase cut, rectified voltage $V_{\Phi\_R}$ at node 414. Each active time period $T_A(n-X)$ equals the time between a first zero crossing $t_{ZC}(n-X)_1$ and the second zero crossing $t_{ZC}(n-X)_2$ of the $(n-X)^{th}$ cycle of the rectified input voltage $V_{\Phi R\_IN}$. Thus, in at least one embodiment, in operation 602, the trailing edge high resistance state predictor 412 detects the time between approximate zero crossings $t_{ZC}(n-X)_1$ and $t_{ZC}(n-X)_2$ of each cycle of the phase cut, rectified voltage $V_{\Phi\_R}$ to determine the active periods $T_A(n-X)$ of the phase cut, rectified voltage $V_{\Phi\_R}$ for X ranging from 1 to N.

In operation 603, the trailing edge high resistance state predictor 412 predicts an estimated active period $T_A(n)_{EST}$ of nth cycle of the phase cut, rectified voltage $V_{\Phi\_R}$. The particular algorithm for predicting the estimated active period $T_A(n)_{EST}$ is a matter of design choice. In at least one embodiment, the trailing edge high resistance state predictor 412 assumes that the estimated active period $T_A(n)_{EST}$ is equal to the previous actual measured active period $T_A(n-1)$. In at least one embodiment, the trailing edge high resistance state predictor 412 utilizes an algorithm that reflects a trend of the durations of the active periods $T_A(n-X)$ for the previous N cycles of the phase cut, rectified voltage $V_{\Phi\_R}$. For example, in at least one embodiment, N equals 2, and the trailing edge high resistance state predictor 412 determines a trend in the durations of the active periods using Equation [2] to predict the estimated $n^{th}$ active period $T_A(n)_{EST}$:

$$T_A(n)_{EST}=T_A(n-1)+T_A(n-1)-T_A(n-2)=2\cdot T_A(n-1)-T_A(n-2) \quad [2].$$

In Equation [2], $T_A(n)_{EST}$ represents the predicted active time period for the $n^{th}$ cycle, $T_A(n-1)$ represents an approximate actual time period for the previous (n-1) cycle, and $T_A(n-2)$ represents an approximate actual measured time period for the previous (n-2) cycle. As discussed in more detail in conjunction with FIG. 8, the trailing edge high resistance state predictor 412 detects approximate actual zero crossings of each active cycle of the phase cut, rectified voltage $V_{\Phi\_R}$.

From the detection of the actual zero crossings, in at least one embodiment, the trailing edge high resistance state predictor 412 determines an approximate actual active time period $T_A(n)$. The determined, approximate actual time period $T_A(n)$ becomes the approximate actual time period $T_A(n-1)$ used in Equation [2] when estimating the active time period for the next cycle of phase cut, rectified voltage $V_{\Phi\_R}$ and becomes the approximate actual time period $T_A(n-2)$ used in Equation [2] when estimating the active time period for the cycle of phase cut, rectified voltage $V_{\Phi\_R}$ after the next cycle.

In at least one embodiment, the trailing edge high resistance state predictor 412 segregates the odd and even cycles of the phase cut, rectified voltage $V_{\Phi\_R}$ because the odd and even cycles correlate better with each other. When segregating the odd and even cycles, the trailing edge high resistance state predictor 412 determines the trend in the durations of the even active periods using Equation [3] to predict the estimated $n^{th}$ active period $T_A(n)_{EST}$:

$$T_A(n)_{EST} = T_A(n-2) + T_A(n-2) - T_A(n-4) = 2 \cdot T_A(n-2) - T_A(n-4) \quad [3].$$

When segregating the odd and even cycles, the trailing edge high resistance state predictor 412 determines the trend in the durations of the odd active periods using Equation [4] to predict the estimated n+1 active period $T_A(n)_{EST}$:

$$T_A(n+1)_{EST} = T_A(n-1) + T_A(n-1) - T_A(n-3) = 2 \cdot T_A(n-1) - T_A(n-3) \quad [4].$$

In operation 604, the trailing edge high resistance state predictor 412 detects the first, approximate zero crossing $t_{ZC}(n)_1$ of the present $n^{th}$ cycle of the phase cut, rectified voltage $V_{\Phi\_R}$. From a known first zero crossing time $t_{ZC}(n)_1$ of the $n^{th}$ cycle and the predicted, estimated zero crossing time period $T_A(n)_{EST}$, the trailing edge high resistance state predictor 412 predicts when the second zero crossing time $t_{ZC}(n)_2$ will occur.

In operation 606, the trailing edge high resistance state predictor 412 predicts an estimated occurrence of a high resistance state of the trailing edge dimmer 404 based on the duration of n prior cycles of the phase cut, rectified voltage $V_{\Phi\_R}$ and detection of first, approximate zero crossing $t_{ZC}(n)_1$ of the present $n^{th}$ cycle. In at least one embodiment, the trailing edge high resistance state predictor 412 determines a predicted, estimated occurrence of the high resistance state of the trailing edge dimmer 404 for the $n^{th}$ cycle by assuming that the occurrence of the high resistance state of the trailing edge dimmer 404 equals the predicted second zero crossing $t_{ZC}(n)_2$ of the $n^{th}$ cycle less an estimated decay time $T_{DC}(n)$ of the trailing edge 502 of the phase cut, rectified voltage $V_{\Phi\_R}$ for the $n^{th}$ cycle.

Figure 1:
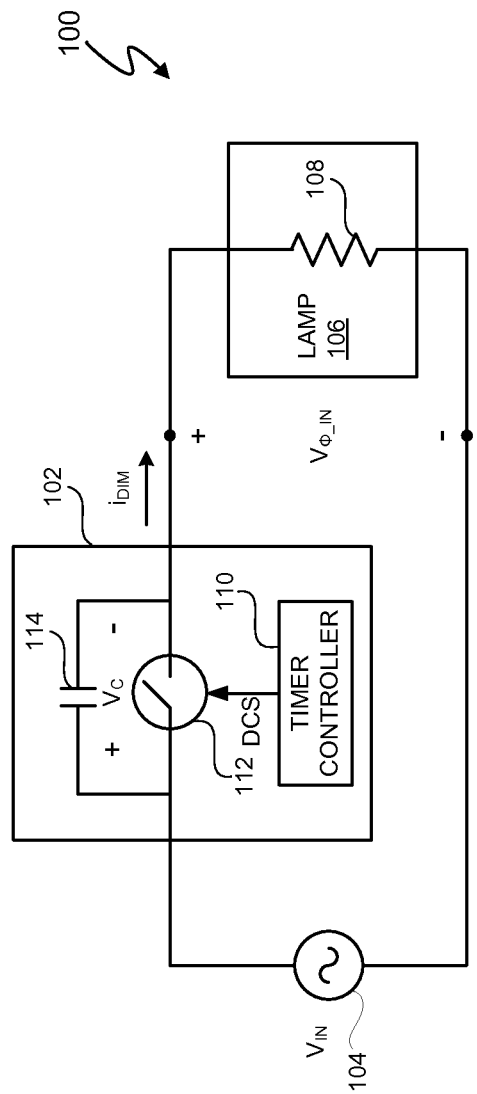
FIG. 1 (labeled prior art) depicts a lighting system that includes a trailing edge dimmer.
Figure 2:
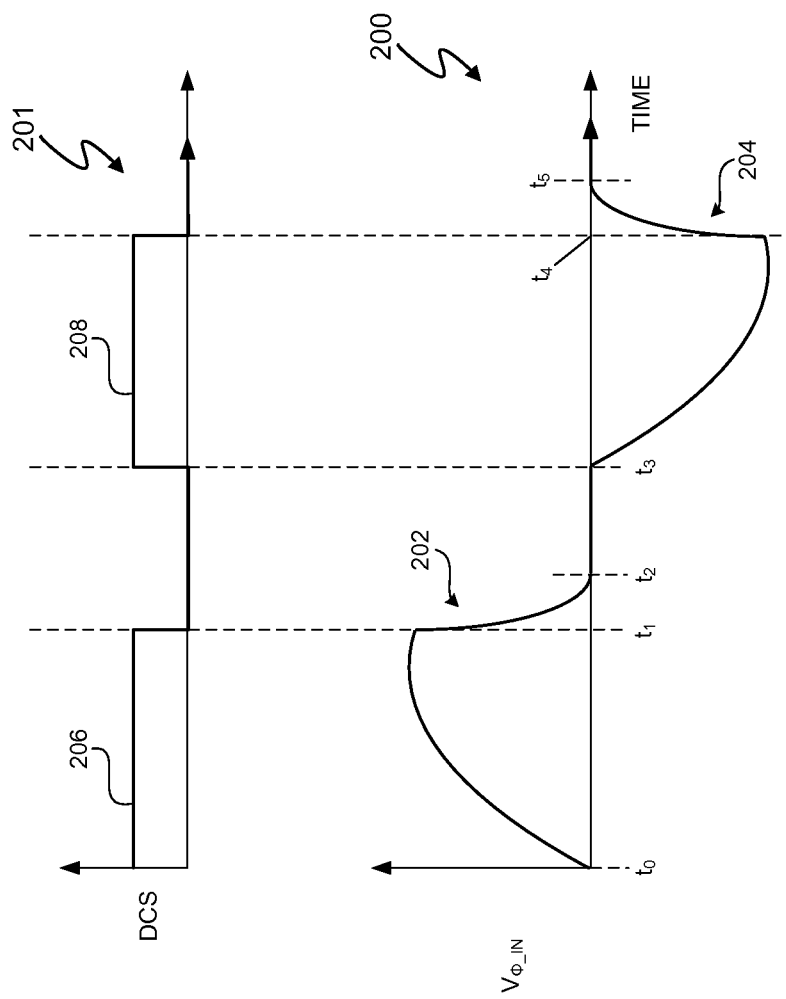
FIG. 2 (labeled prior art) depicts a dimmer control signal and voltage waveform associated with the trailing edge dimmer of FIG. 1.
Figure 3:
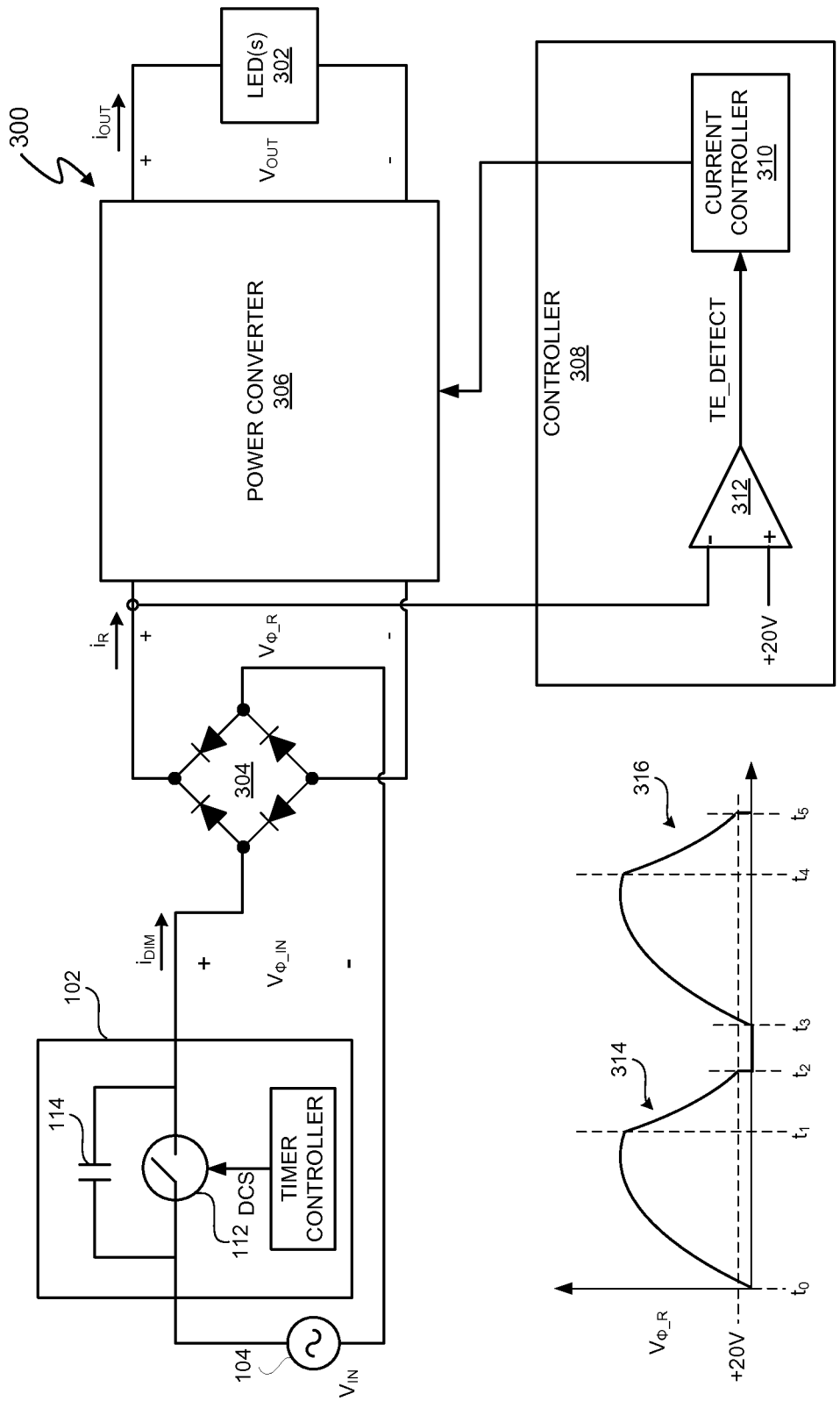
FIG. 3 (labeled prior art) depicts a lighting system that includes a trailing edge dimmer 102 and LED(s).

The method of obtaining the estimated decay time $T_{DC}(n)$ is a matter of design choice. In at least one embodiment, the trailing edge high resistance state predictor 412 utilizes a pre-stored estimated decay time $T_{DC}(n)$, such as 180 μsec, based on a worst case value of a capacitor, such as capacitor 114 (FIG. 1), of the trailing edge dimmer 404 and an amount of current $i_{DIM}$ controlled by the current control module 416. In other embodiments, the trailing edge high resistance state predictor 412 utilizes any of a number of algorithms to determine the estimated decay time $T_{DC}(n)$ of the phase cut, rectified voltage $V_{\Phi\_R}$. For example, in at least one embodiment, estimated decay times are stored in a look-up table (not shown) for various capacitance values of the trailing edge dimmer 404 and the phase cut angles of phase cut, rectified voltage $V_{\Phi\_R}$ and accessed by the trailing edge high resistance state predictor 412. In at least one embodiment, a value of the capacitance of the trailing edge dimmer 404 is stored in an optional memory 417 of the trailing edge high resistance state predictor 412. In at least one embodiment, the trailing edge high resistance state predictor 412 measures or determines the decay time $T_{DC}(n-1)$ for the previous $(n-1)^{th}$ cycle of the phase cut, rectified voltage $V_{\Phi\_R}$ and utilizes the decay time $T_{DC}(n-1)$ from the previous $(n-1)^{th}$ cycle as the decay time $T_{DC}(n)$ for the present $n^{th}$ cycle of the phase cut, rectified voltage $V_{\Phi\_R}$. In at least one embodiment, the decay times for the light source 410 at particular phase cut angles are empirically determined in a laboratory setting using actual dimmers and actual light sources, such as LEDs and/or CFLs. The decay times of the phase cut, rectified voltage $V_{\Phi\_R}$ are then stored in an optional non-volatile memory 417 via a terminal 419 of the controller 402 and utilized by the trailing edge high resistance state predictor 412 to predict the estimated occurrence of a high resistance state of the trailing edge dimmer 404.

In at least one embodiment, the operation 606 takes into consideration that the phase angle of the phase cut, rectified voltage $V_{\Phi\_R}$ can decrease from cycle-to-cycle as a dimming level is decreased. To compensate for a potential decrease in the phase angle, the trailing edge high resistance state predictor 412 subtracts a dynamic dimming level compensation time $T_{DDLC}$ from the second zero crossing time $t_{ZC}(n)_2$ to obtain a predicted occurrence of the high resistance state of the dimmer at time $t_{HR}(n)$. The value of the dynamic dimming level compensation time $t_{DDLC}$ is a matter of design choice, and, in at least one embodiment, represents the largest possible change between the predicted estimates of the active periods $T_A(n)_{EST}$ and $t_A(n-1)_{EST}$. In at least one embodiment, the dynamic dimming level compensation time $t_{DDLC}$ is 120 μsec. Thus, in at least one embodiment, the predicted occurrence of the high resistance state of the dimmer $t_{HR}(n)$ equals $t_{ZC}(n)_2 - (T_{DC} - T_{DDLC})$. In at least one embodiment, the dynamic dimming level compensation time $t_{DDLC}$ is a percentage, such as 50-75%, of the decay time $T_{DC}(n)$. The trailing edge high resistance state predictor 412 provides the HRSTATE_PREDICTION signal to the current control module 416 to indicate the predicted occurrence of the high resistance state of the dimmer $t_{HR}(n)$.

In operation 608, at the predicted occurrence of the dimmer high resistance state $t_{HR}(n)$, the trailing edge high resistance state predictor 412 increases an amount of dimmer current $i_{DIM}$ transferred to the power converter 406 through the trailing edge dimmer 404. The increase in the dimmer current $i_{DIM}$ decreases the decay time $T_{DC}$ and, thus, accelerates transition of the trailing edge of the $n^{th}$ cycle of the phase cut, rectified voltage $V_{\Phi\_R}$ to a predetermined threshold voltage value. In at least one embodiment, the predetermined voltage threshold is in the range between 0 and 65V. In the exemplary depiction of the current $i_R$, which is a rectified version of the dimmer current $i_{DIM}$, the current $i_R$ tracks the phase cut, rectified voltage $V_{\Phi\_R}$ until the predicted occurrence of the dimmer high resistance state $t_{HR}(n)$. At the predicted occurrence of the dimmer high resistance state $t_{HR}(n)$, the current control module 416 increases the current $i_R$ transferred through the trailing edge dimmer 404 to the power converter 406 to a trailing accelerator current value $i_{R\_ACCEL}$ than normal operation.

The particular value of the trailing accelerator current value $i_{R\_ACCEL}$ is a matter of design choice. Increasing the trailing accelerator current value $i_{R\_ACCEL}$ decreases the decay time $T_{DC}$ and increases the dimming range of the lighting system 400. Decreasing the trailing accelerator current value $i_{R\_ACCEL}$ increases the decay time $T_{DC}$ and decreases the dimming range of the lighting system 400. The dimming range of the lighting system 400 is increased because the range of phase cut angles, which correlate to dimming levels, is increased while still assuring that the phase cut, rectified voltage $V_{\Phi\_R}$ reaches a zero crossing prior to the next zero crossing. However, increasing the value of the trailing accelerator current value $i_{R\_ACCEL}$ also potentially increases the amount of power to be dissipated by the power converter 406. Furthermore, increasing the value of the trailing accelerator current value $i_{R\_ACCEL}$ can result in the power converter 406 having higher current rated and, thus, more expensive components.

In at least one embodiment, the current control module 416 dynamically adjusts the value of the trailing accelerator current value $i_{R\_ACCEL}$ to ensure operation in discontinuous current mode (DCM) while minimizing power dissipation. In at least one embodiment, the controller 402 can switch between operation in DCM, continuous conduction mode (CCM), and/or critical conduction mode (CRM) to allow the current control module 416 flexibility in selecting the value of the trailing accelerator current value $i_{R\_ACCEL}$. DCM is when the phase cut, rectified voltage $V_{\Phi\_R}$ reaches a second zero crossing $t_{ZC}(n-X)_2$ prior to the first zero crossing $t_{ZC}(n-X+1)_1$ of the next cycle of the phase cut, rectified voltage $V_{\Phi\_R}$. CCM is when the phase cut, rectified voltage $V_{\Phi\_R}$ does not reach a second zero crossing $t_{ZC}(n-X)_2$ prior to the first zero crossing $t_{ZC}(n-X+1)_1$ of the next cycle of the phase cut, rectified voltage $V_{\Phi\_R}$. CRM is when the second zero crossing $t_{ZC}(n-X)_2$ is the same as the first zero crossing $t_{ZC}(n-X+1)_1$ of the next cycle of the phase cut, rectified voltage $V_{\Phi\_R}$.

In at least one embodiment, the trailing accelerator current value $i_{R\_ACCEL}$ is 100-500% higher than the peak normal operational value of the current $i_R$. In at least one embodiment, the normal operational current peaks at approximately 100 mA, and the trailing edge accelerator current value $i_{R\_ACCEL}$ is approximately 500 mA. In at least one embodiment, the power converter 406 includes one or more optional power dissipation circuits 418 to transfer the additional current $i_R$ and dissipate power associated with the additional current $i_R$. Exemplary power dissipation circuits are described in (i) U.S. patent application Ser. No. 13/289,845, filed Nov. 4, 2011, entitled "Controlled Power Dissipation in a Switch Path in a Lighting System", and inventors John L. Melanson and Eric J. King, (ii) U.S. patent application Ser. No. 13/289,931, filed Nov. 4, 2011, entitled "Controlled Power Dissipation in a Lighting System", and inventors John L. Melanson and Eric J. King, and (iii) Ser. No. 13/289,967 filed Nov. 4, 2011, entitled "Controlled Power Dissipation in a Link Path in a Lighting System", and inventors John L. Melanson and Eric J. King.

In at least one embodiment, because the voltage supply 104 is able to provide an amount of current that greatly exceeds the trailing accelerator current value $i_{R\_ACCEL}$, if the dimming level and, thus, the phase angle of the phase cut, rectified voltage $V_{\Phi\_R}$ increases rather than decreases, the trailing accelerator current value $i_{R\_ACCEL}$ will not distort the phase cut, rectified voltage $V_{\Phi\_R}$ waveform.

In at least one embodiment, at each second zero crossing $t_{ZC}(n-X)_2$, the current control module 416 transfers current $i_R$ through the dimmer 404 so that the power converter 406 enters a low impedance state. In at least one embodiment, the current in the low impedance state is referred to as a glue current and is, for example, generally described in U.S. patent application Ser. No. 12/858,164, filed Aug. 17, 2010, entitled: "Dimmer Output Emulation", and inventor: John L. Melanson (referred to herein as "Melanson I") and U.S. patent application Ser. No. 13/217,174, filed Aug. 24, 2011, entitled: "Multi-Mode Dimmer Interfacing Including Attach State Control", and inventors: Eric J. King and John L. Melanson, which are both incorporated by reference in their entireties.

The particular implementation of the trailing edge high resistance state predictor 412 is a matter of design choice. The trailing edge high resistance state predictor 412 can be implemented using analog, digital, or analog and digital circuits and can be implemented using discrete components. In at least one embodiment, the controller 402 is an integrated circuit, and the trailing edge high resistance state predictor 412 and current control module 416 are implemented as part of the integrated circuit. In at least one embodiment, the controller 402 includes a processor (not shown) and a memory (not shown) to store and execute code that implements one or more embodiments of the exemplary trailing edge compatibility operational flow chart 600.

Figure 7:
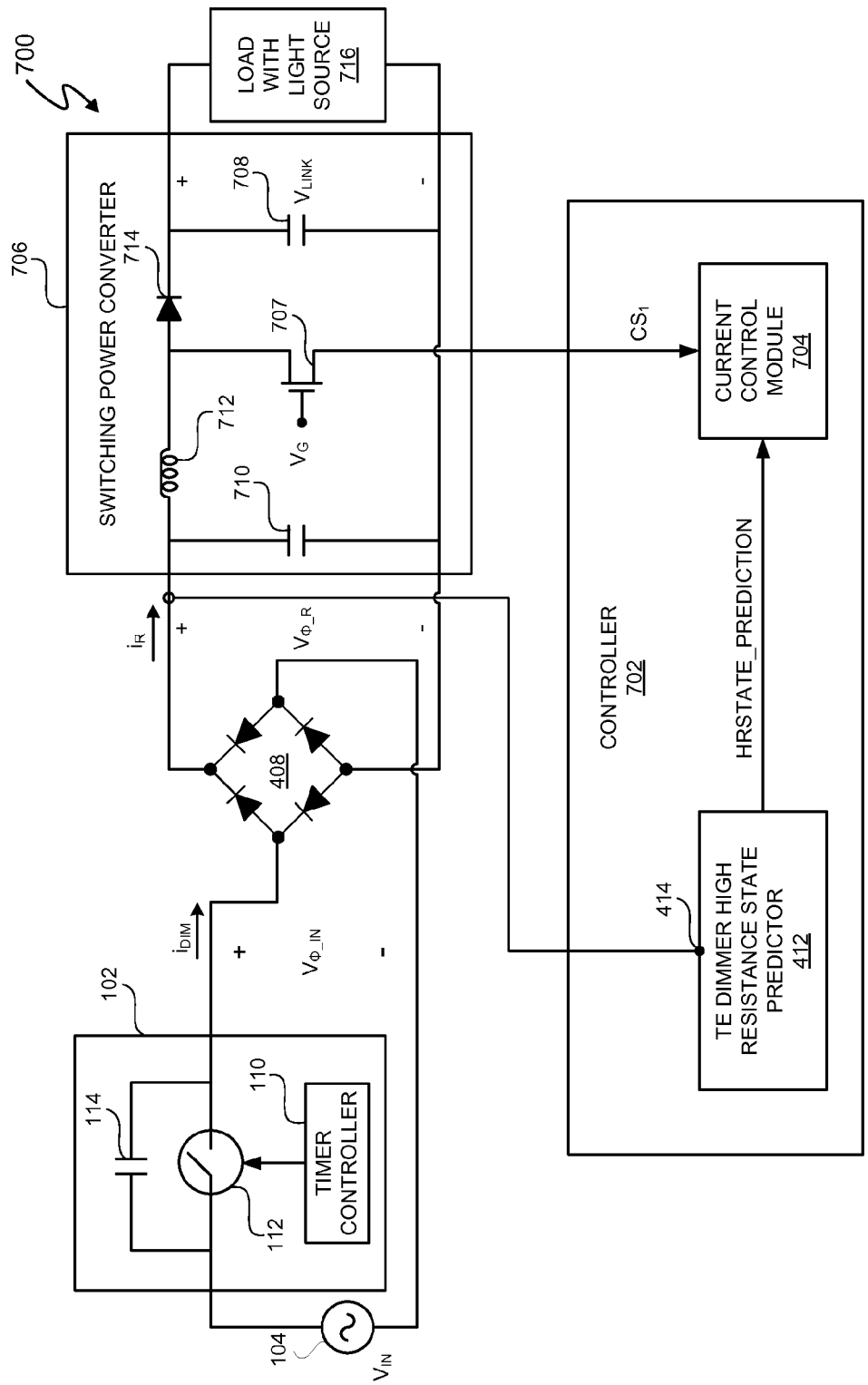
FIG. 7 depicts a lighting system that represents one embodiment of the lighting system of FIG. 4.

FIG. 7 depicts a lighting system 700, which is one embodiment of the lighting system 400. The lighting system 700 includes controller 702, which includes the trailing edge dimmer high resistance state predictor 412. The trailing edge dimmer high resistance state predictor 412 generates the HRSTATE_PREDICTION signal and provides the HRSTATE_PREDICTION signal to the current control module 704 to indicate the predicted occurrence of the high resistance state of the dimmer $t_{HR}(n)$ as previously described with reference to lighting system 400. The current control module 704 controls the boost-type switching power converter 706 using the same current and voltage profiles as discussed with reference to lighting system 400 and as depicted in the exemplary voltage and current waveforms 500 (FIG. 5). The switching power converter 706 includes a boost switch 707, and the current control module 704 controls power factor correction and regulates the link voltage $V_{LINK}$ across link capacitor 708 as, for example, described in U.S. patent application Ser. No. 11/967,269, entitled "Power Control System Using a Nonlinear Delta-Sigma Modulator With Nonlinear Power Conversion Process Modeling", filed on Dec. 31, 2007, inventor John L. Melanson (referred to herein as "Melanson I"), U.S. patent application Ser. No. 11/967,275, entitled "Programmable Power Control System", filed on Dec. 31, 2007, and inventor John L. Melanson (referred to herein as "Melanson II"), U.S. patent application Ser. No. 12/495,457, entitled "Cascode Configured Switching Using at Least One Low Breakdown Voltage Internal, Integrated Circuit Switch to Control At Least One High Breakdown Voltage External Switch", filed on Jun. 30, 2009 ("referred to herein as "Melanson III"), and inventor John L. Melanson, and U.S. patent application Ser. No. 12/174,404, entitled "Constant Current Controller With Selectable Gain", filing date Jun. 30, 2011, and inventors John L. Melanson, Rahul Singh, and Siddharth Maru, which are all incorporated by reference in their entireties.

The switching power converter includes capacitor 710, which filters high frequency components from rectified voltage $V_{\Phi R\_IN}$. Gate bias voltage $V_G$ biases the gate of switch 707. The particular value of the gate bias voltage $V_G$ is a matter of design choice and, for example, depends on the operational parameters of the switch 707. In at least one embodiment, the gate bias voltage $V_G$ is +12V. To control the operation of switching power converter 108, controller 110 generates a control signal $CS_1$ to control conductivity of field effect transistor (FET) switch 707. The control signal $CS_1$ is a pulse width modulated signal. Each pulse of control signal $CS_1$ turns switch 707 ON (i.e. conducts), and the inductor current $i_R$ increases to charge inductor 712. Diode 714 prevents current flow from link capacitor 708 into switch 707. When the pulse ends, the inductor 712 reverses voltage polarity (commonly referred to as "flyback"), and the inductor current $i_R$ decreases during the flyback phase. The inductor current $i_R$ boosts the link voltage across the link capacitor 708 through diode 714. The switching power converter 706 is a boost-type converter, and, thus, the link voltage $V_{LINK}$ is greater than the phase cut, rectified voltage $V_{\Phi\_R}$. The load with electronic light source 716 includes, for example, a transformer-based interface circuit to provide power to the electronic light sources.

Figure 8:
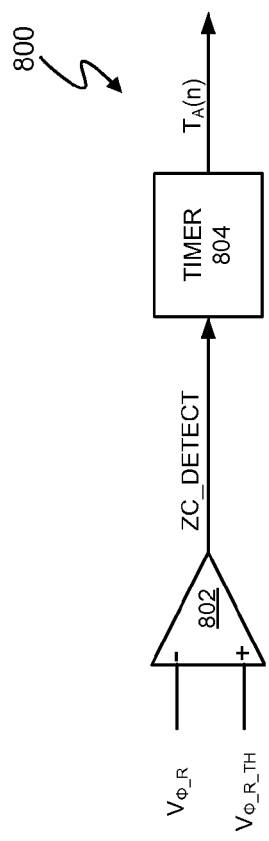
FIG. 8 depicts a zero crossing and active period detector.

FIG. 8 depicts one embodiment of a zero crossing and active time detector 800, which is used in one embodiment of the trailing edge high resistance state predictor 412 (FIG. 4) to detect the approximate values of zero crossings $t_{ZC}(n)_1$ and $t_{ZC}(n)_2$ of the phase cut, rectified voltage $V_{\Phi\_R}$. The zero crossing detector 800 includes a comparator 802 to compare the phase cut, rectified voltage $V_{\Phi\_R}$ and a phase cut, rectified voltage $V_{\Phi\_R}$ threshold value. The phase cut, rectified voltage $V_{\Phi\_R}$ threshold value is, for example, in the range of 0-15V. When the comparator 802 detects that the phase cut, rectified voltage $V_{\Phi\_R}$ has transitioned to become greater than the phase cut, rectified voltage $V_{\Phi\_R}$ threshold, the ZC_DETECT output signal of the comparator 802 indicates the transition by changing from a logical 1 to a logical 0. The transition indicates detection of the first zero crossing $t_{ZC}(n)_1$. Then, the timer 804 begins counting at a frequency much greater than the frequency of phase cut, rectified voltage $V_{\Phi\_R}$. For example, in at least one embodiment, the timer 804 counts at a frequency of 10 kHz or greater. When the comparator 802 detects that the phase cut, rectified voltage $V_{\Phi\_R}$ is less than the phase cut, rectified voltage $V_{\Phi\_R}$ threshold, the ZC_DETECT output signal of the comparator 802 indicates the detection by changing from a logical 0 to a logical 1. The transition from logical 0 to logical 1 of the ZC_DETECT output signal indicates detection of the second zero crossing $t_{ZC}(n)_2$. The timer 804 then indicates the time between the detection of the two zero crossings, which is the approximate actual active time $T_A(n)$.

Figure 9:
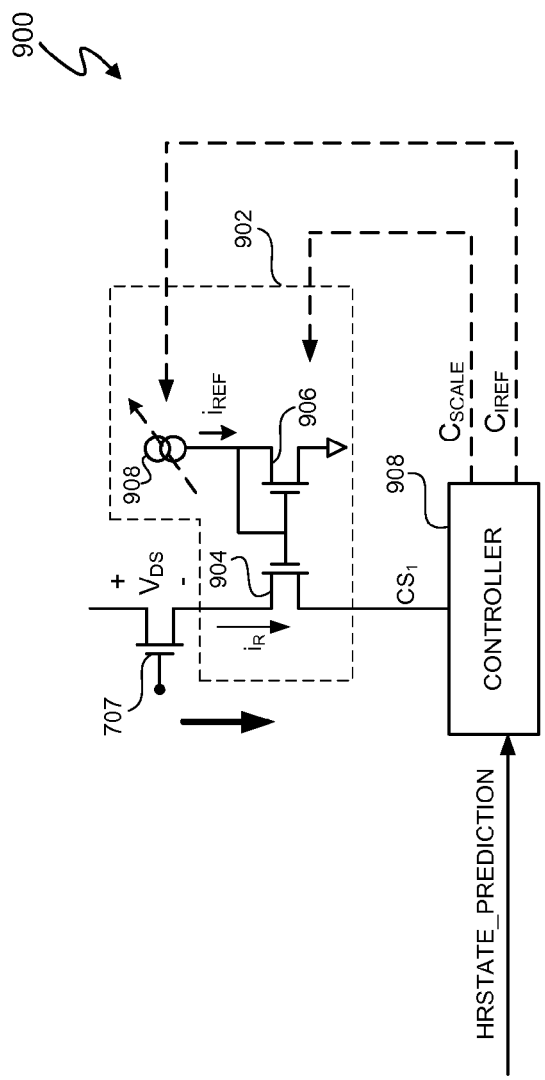
FIG. 9 depicts a current control module.

FIG. 9 depicts a current control module 900, which represents one embodiment of a current control module 704. The current control module 900 includes a controllable current source 902. The current source 902 includes FETs 904 and 906, which are configured as a current mirror. Referring to FIGS. 7 and 9, in at least one embodiment, the controller 908 modulates the control signal $CS_1$ to control current through switch 707 to control power factor correction and regulate the link voltage $V_{LINK}$ of the switching power converter 706, generate the trailing accelerator current value $i_{R\_ACCEL}$, generate the low impedance state of the switching power converter 706, and dissipate excess power, as previously described.

Current source 902 supplies a reference current $i_{REF}$, which flows through FET 906. In at least one embodiment, control signal $CS_1$ turns boost switch 707 ON. The size of FET 904 is scaled to the size of FET 906 by a scaling factor of Z. The value of the scaling factor Z is a positive number and a matter of design choice. The value of the scaling factor Z times the value of the reference current $i_{REF}$ sets the trailing accelerator current value $i_{R\_ACCEL}$. Thus, when the trailing edge high resistance state predictor 412 predicts the occurrence of the high resistance state of the dimmer $t_{HR}(n)$, the controller 908 causes the controllable current source 902 to transfer the trailing accelerator current value $i_{R\_ACCEL}$ to the switching power converter 706.

Thus, an electronic system includes a controller, and the controller provides compatibility between an electronic light source and a trailing edge dimmer. In at least one embodiment, the controller is capable of predicting an estimated occurrence of a trailing edge of a phase cut AC voltage and accelerating a transition of the phase cut AC voltage from the trailing edge to a predetermined voltage threshold.

Although embodiments have been described in detail, it should be understood that various changes, substitutions, and alterations can be made hereto without departing from the spirit and scope of the invention as defined by the appended claims.

What is claimed is:

1. An apparatus comprising:
   a controller to provide compatibility between a lamp and a trailing edge dimmer, wherein the controller is configured to:
      predict an estimated time when the trailing edge dimmer enters a high resistance state, wherein the time when the trailing edge dimmer enters the high resistance state occurs when the trailing edge dimmer begins phase cutting an alternating current (AC) voltage signal;
      operate in a high current mode based on the estimated predicted occurrence of the high resistance state of the trailing edge dimmer; and
      operate in a low impedance mode after the AC voltage signal reaches a low voltage threshold.

2. The apparatus of claim 1 wherein the controller is further configured to predict the estimated time when the trailing edge dimmer enters a high resistance state of the trailing edge dimmer from prior determined times when the trailing edge dimmer enters the high resistive state.

3. The apparatus of claim 2 wherein the controller is further configured to:
   predict the estimated time when the trailing edge dimmer enters a high resistance state of the trailing edge dimmer from trends indicated by multiple preceding times when the trailing edge dimmer entered a high resistance state.

4. The apparatus of claim 3 wherein the controller is further configured to predict the estimated time when the trailing edge dimmer enters a high resistance state of the trailing edge dimmer from changes between an immediately preceding time when the trailing edge dimmer enters a high resistance state and at least an earlier preceding time when the trailing edge dimmer enters a high resistance state.

5. The apparatus of claim 1 wherein the controller is further configured to predict the estimated time when the trailing edge dimmer enters a high resistance state separately for odd cycles of the AC voltage signal and even cycles of the AC voltage signal.

6. The apparatus of claim 1 wherein the controller is further configured to:
   compare the phase-cut AC voltage signal with a threshold value that represents an approximate zero voltage level of the AC voltage signal;
   determine an elapsed time between when comparisons of the AC voltage signal with the threshold value indicates the AC voltage signal has approached two consecutive zero voltage level of the AC voltage signal;
   determine an approximate active time period of the trailing edge dimmer, detect a third consecutive zero voltage level of the AC voltage signal; and
   predict the estimated time when the trailing edge dimmer enters the high resistance state of the trailing edge dimmer by adding the determined approximate active time period to a time when the third consecutive zero voltage level of the AC voltage signal was detected and subtracting an estimated decay time of a trailing edge of the phase-cut the AC voltage signal.

7. The apparatus of claim 1 wherein the controller is capable to operate in the high current mode prior to when the trailing edge dimmer begins phase cutting an alternating current (AC) voltage signal.

8. The apparatus of claim 7 wherein the controller is capable to operate in the high current mode within 0.1 milliseconds prior to when the trailing edge dimmer begins phase cutting an alternating current (AC) voltage signal.

9. The apparatus of claim 1 wherein the controller is capable to operate in the high current mode prior to the estimated predicted occurrence of the high resistance state of the trailing edge dimmer.

10. The apparatus of claim 1 wherein the lamp comprises one or more light emitting diodes, and the apparatus further comprises:
a switching power converter coupled to the controller.

11. A method to provide compatibility between a lamp and a trailing edge dimmer, the method comprising:
predicting an estimated time when the trailing edge dimmer enters a high resistance state, wherein the time when the trailing edge dimmer enters the high resistance state occurs when the trailing edge dimmer begins phase cutting an alternating current (AC) voltage signal;
operating a controller of at least a power converter in a high current mode based on the estimated predicted occurrence of the high resistance state of the trailing edge dimmer; and
operating the controller in a low impedance mode after the AC voltage signal reaches a low voltage threshold.

12. The method of claim 11 wherein predicting an estimated time when the trailing edge dimmer enters a high resistance state of the trailing edge dimmer comprises predicting the estimated time when the trailing edge dimmer enters a high resistance state of the trailing edge dimmer from prior determined times when the trailing edge dimmer enters the high resistive state.

13. The method of claim 12 wherein predicting an estimated time when the trailing edge dimmer enters a high resistance state of the trailing edge dimmer further comprises:
predicting the estimated time when the trailing edge dimmer enters a high resistance state of the trailing edge dimmer from trends indicated by multiple preceding times when the trailing edge dimmer entered a high resistance state.

14. The method of claim 13 wherein predicting an estimated time when the trailing edge dimmer enters a high resistance state of the trailing edge dimmer further comprises:
predicting the estimated time when the trailing edge dimmer enters a high resistance state of the trailing edge dimmer from changes between an immediately preceding time when the trailing edge dimmer enters a high resistance state and at least an earlier preceding time when the trailing edge dimmer enters a high resistance state.

15. The method of claim 11 wherein predicting an estimated time when the trailing edge dimmer enters a high resistance state of the trailing edge dimmer further comprises:
predicting the estimated time when the trailing edge dimmer enters a high resistance state separately for odd cycles of the AC voltage signal and even cycles of the AC voltage signal.

16. The method of claim 11 wherein predicting an estimated time when the trailing edge dimmer enters a high resistance state of the trailing edge dimmer further comprises:
comparing the phase-cut AC voltage signal with a threshold value that represents an approximate zero voltage level of the AC voltage signal;
determining an elapsed time between when comparisons of the AC voltage signal with the threshold value indicates the AC voltage signal has approached two consecutive zero voltage level of the AC voltage signal;
determining an approximate active time period of the trailing edge dimmer, detect a third consecutive zero voltage level of the AC voltage signal; and
predicting the estimated time when the trailing edge dimmer enters the high resistance state of the trailing edge dimmer by adding the determined approximate active time period to a time when the third consecutive zero voltage level of the AC voltage signal was detected and subtracting an estimated decay time of a trailing edge of the phase-cut the AC voltage signal.

17. The method of claim 11 further comprising:
operating the controller in the high current mode prior to when the trailing edge dimmer begins phase cutting an alternating current (AC) voltage signal.

18. The method of claim 17 further comprising:
operating the controller in the high current mode within 0.1 milliseconds prior to when the trailing edge dimmer begins phase cutting an alternating current (AC) voltage signal.

19. The method of claim 11 further comprising:
operating the controller in the high current mode prior to the estimated predicted occurrence of the high resistance state of the trailing edge dimmer.

20. The method of claim 11 wherein the lamp comprises one or more light emitting diodes.

21. An apparatus comprising:
a controller configured to:
predict an estimated time when the trailing edge dimmer enters a high resistance state, wherein the time when the trailing edge dimmer enters the high resistance state occurs when the trailing edge dimmer begins phase cutting an alternating current (AC) voltage signal; and
accelerate a transition of the AC voltage from the trailing edge to a predetermined voltage threshold.

22. The apparatus of claim 20 wherein the controller is further configured to predict the estimated time when the trailing edge dimmer enters a high resistance state of the trailing edge dimmer from prior determined times when the trailing edge dimmer enters the high resistive state.

23. The apparatus of claim 21 wherein the controller is further configured to:
predict the estimated time when the trailing edge dimmer enters a high resistance state of the trailing edge dimmer from trends indicated by multiple preceding times when the trailing edge dimmer entered a high resistance state.

24. The apparatus of claim 22 wherein the controller is further configured to predict the estimated time when the trailing edge dimmer enters a high resistance state of the trailing edge dimmer from changes between an immediately preceding time when the trailing edge dimmer enters a high resistance state and at least an earlier preceding time when the trailing edge dimmer enters a high resistance state.

25. The apparatus of claim 20 wherein the controller is further configured to predict the estimated time when the trailing edge dimmer enters a high resistance state separately for odd cycles of the AC voltage signal and even cycles of the AC voltage signal.

26. The apparatus of claim 20 wherein the controller is further configured to:
compare the phase-cut AC voltage signal with a threshold value that represents an approximate zero voltage level of the AC voltage signal;
determine an elapsed time between when comparisons of the AC voltage signal with the threshold value indicates the AC voltage signal has approached two consecutive zero voltage level of the AC voltage signal;

determine an approximate active time period of the trailing edge dimmer, detect a third consecutive zero voltage level of the AC voltage signal; and predict the estimated time when the trailing edge dimmer enters the high resistance state of the trailing edge dimmer by adding the determined approximate active time period to a time when the third consecutive zero voltage level of the AC voltage signal was detected and subtracting an estimated decay time of a trailing edge of the phase-cut the AC voltage signal.

27. The apparatus of claim 21 wherein the lamp comprises one or more light emitting diodes, and the apparatus further comprises:
a switching power converter coupled to the controller.

28. A method comprising:
predicting an estimated time when the trailing edge dimmer enters a high resistance state, wherein the time when the trailing edge dimmer enters the high resistance state occurs when the trailing edge dimmer begins phase cutting an alternating current (AC) voltage signal; and
accelerating a transition of the AC voltage from the trailing edge to a predetermined voltage threshold.

29. The method of claim 27 wherein predicting an estimated time when the trailing edge dimmer enters a high resistance state of the trailing edge dimmer comprises predicting the estimated time when the trailing edge dimmer enters a high resistance state of the trailing edge dimmer from prior determined times when the trailing edge dimmer enters the high resistive state.

30. The method of claim 28 wherein predicting an estimated time when the trailing edge dimmer enters a high resistance state of the trailing edge dimmer further comprises:
predicting the estimated time when the trailing edge dimmer enters a high resistance state of the trailing edge dimmer from trends indicated by multiple preceding times when the trailing edge dimmer entered a high resistance state.

31. The method of claim 29 wherein predicting an estimated time when the trailing edge dimmer enters a high resistance state of the trailing edge dimmer further comprises:
predicting the estimated time when the trailing edge dimmer enters a high resistance state of the trailing edge dimmer from changes between an immediately preceding time when the trailing edge dimmer enters a high resistance state and at least an earlier preceding time when the trailing edge dimmer enters a high resistance state.

32. The method of claim 28 wherein predicting an estimated time when the trailing edge dimmer enters a high resistance state of the trailing edge dimmer further comprises:
predicting the estimated time when the trailing edge dimmer enters a high resistance state separately for odd cycles of the AC voltage signal and even cycles of the AC voltage signal.

33. The method of claim 28 wherein predicting an estimated time when the trailing edge dimmer enters a high resistance state of the trailing edge dimmer further comprises:
comparing the phase-cut AC voltage signal with a threshold value that represents an approximate zero voltage level of the AC voltage signal;
determining an elapsed time between when comparisons of the AC voltage signal with the threshold value indicates the AC voltage signal has approached two consecutive zero voltage level of the AC voltage signal;
determining an approximate active time period of the trailing edge dimmer, detect a third consecutive zero voltage level of the AC voltage signal; and
predicting the estimated time when the trailing edge dimmer enters the high resistance state of the trailing edge dimmer by adding the determined approximate active time period to a time when the third consecutive zero voltage level of the AC voltage signal was detected and subtracting an estimated decay time of a trailing edge of the phase-cut the AC voltage signal.

34. The method of claim 28 further comprising:
controlling a switching power converter coupled to one or more light emitting diodes.

* * * * *